Figure 1:
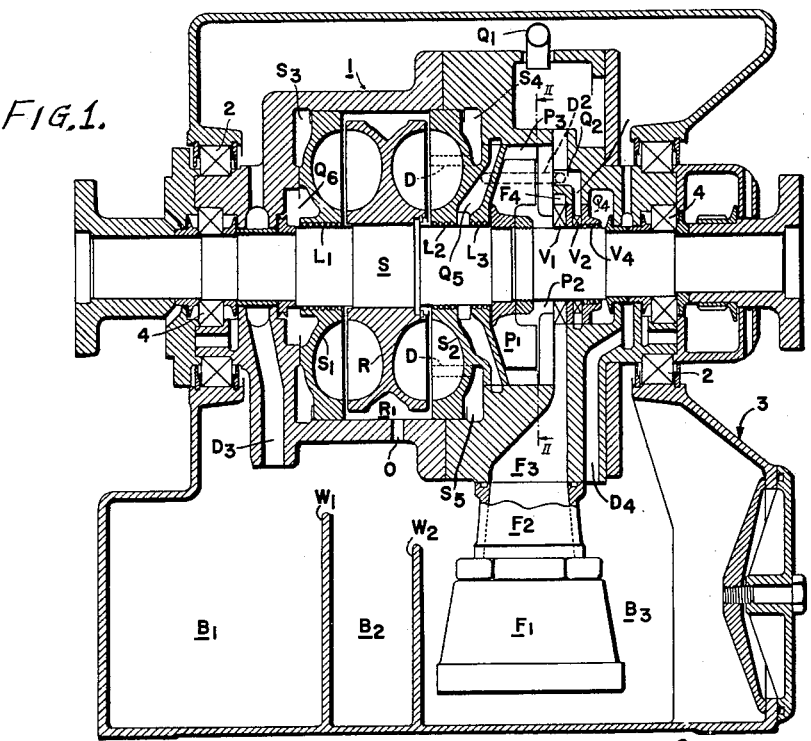

March 28, 1961  W. N. BATHURST  2,976,960
DYNAMOMETERS
Filed Aug. 28, 1957

INVENTOR
William N. Bathurst
By Holcomb, Wetherill & Brisbois
ATTORNEYS

United States Patent Office 2,976,960
Patented Mar. 28, 1961

2,976,960

DYNAMOMETERS

William Nevile Bathurst, Worcester, England, assignor to Heenan & Froude Limited, Worcester, England, a British company Filed Aug. 28, 1957, Ser. No. 680,878

Claims priority, application Great Britain Aug. 30, 1956

6 Claims. (Cl. 188—90)

The present invention relates to hydraulic brakes or dynamometers for absorbing and measuring the power developed by rotating shafts, more particularly of the type in which a rotor mounted upon a shaft is enclosed within a casing supporting a stator cooperating with the rotor and with liquid circulating in the casing to destroy power when the rotor is rotated with respect to the stator. The rotor and/or the stator may be provided with vanes, pockets or apertures, or may also be of smooth form.

It is an object of the invention to provide an improved dynamometer of the type referred to in which the power absorbed by the dynamometer is substantially proportional to the cube of the speed of the dynamometer rotor and the torque is substantially porportional to the square of the said speed.

The said object is achieved if the dynamometer is designed to give a developed casing pressure P equal to the square of the speed and this condition is met if the dynamometer is provided with a discharge outlet such that the casing pressure P is proportional to the square of the rate of discharge of the liquid from the casing, and the dynamometer is supplied with liquid at a rate proportional to the speed thereof.

According to the present invention a dynamometer of the type referred to is provided with a pump operatively connected to the rotor of the dynamometer for rotation thereby for supplying the liquid to the dynamometer casing at a rate proportional to the speed of rotation of the rotor, and discharge means for discharging the liquid from the casing at a rate which is proportional to the square root of the liquid pressure developed in the dynamometer, the said discharge means including annular throttled passages surrounding the shaft of the rotor between the shaft and the stator of the dynamometer and designed to have a required pressure-flow characteristic.

According to a further feature of the invention the said pump draws liquid from a sump positioned below the axis of the dynamometer and the said discharge means further includes a main discharge outlet positioned in the lowermost part of the casing. In this manner it is not possible for liquid to flow through the pump to the casing when the rotor is stationary and the positioning of the discharge outlet ensures that the casing cannot become waterlogged under low load conditions.

According to a still further feature of the invention the said pump comprises an impellor mounted on the shaft of the dynamometer for rotation in a pump housing formed to provide further restricted passages surrounding the shaft between the shaft and the pump housing and to which liquid is fed in order to provide seals between the shaft and the pump housing. In this manner the conventional stuffing box or other type of contact seal for the pump is dispensed with, thereby obviating the possibility of air being drawn into the pump inlet compartment due to wear of the stuffing box or a defective sealing gasket, with the consequent loss of pressure in the liquid delivered by the pump to the dynamometer casing.

According to a yet still further feature of the invention a shut-off valve is included in the connection between the pump and the inlet to the dynamometer casing for admitting liquid to or cutting of the supply of liquid to the casing thereby to permit the rapid throwing on and off of the load of the dynamometer. Conveniently the said shut off valve is incorporated in a valve for variably controlling the flow of liquid from the pump to the casing.

Figure 2:
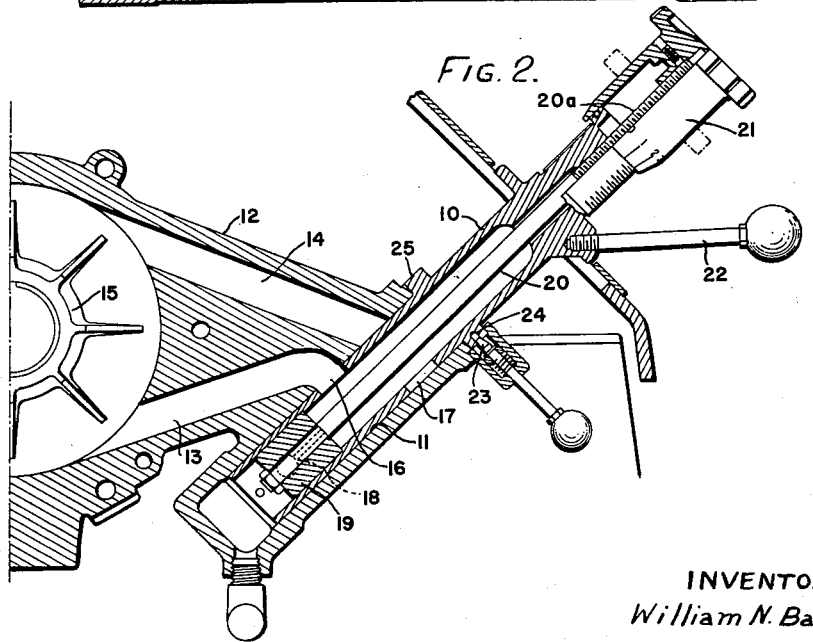

The invention finds special application to dynamometers of the Froude type, and one such dynamometer embodying the invention will now be described with reference to the accompanying drawings in which Figure 1 is a sectional elevation of the daynamometer and, Figure 2 is a part section taken along the line II—II of Figure 1 and drawn to an enlarged scale, and showing one form of control valve interposed in the connection between the pump and the working compartment of the dynamometer casing.

As will be seen from Figure 1 of the drawings, the dynamometer comprises a casing 1 rotatably supported by trunnion bearings 2 within a main housing 3, and itself rotatably supporting by means of bearings 4 concentric with the bearings 2, the shaft S of the dynamometer. Supported within the casing 1 and spaced axially of the shaft S are two half stators S1 and S2 defining therebetween a working compartment R1 in which a rotor R secured to the shaft S is positioned. As shown in Figure 1 the rotor and stator are conventional "Froude" elements having vanes normally set at 45° with respect to the face of the rotor and stator respectively and inlet ducts D extending through the half stator S2 for admitting water to the working compartment R1. Also mounted on the shaft S is the impeller P1 of a vane type pump, the impeller P1 rotating within the pump chamber P3 formed in the casing 1. A duct F3 extends from the pump inlet P2 through the casing to an inlet pipe F2 secured to the bottom of the casing and extending downwardly therefrom to support an inlet valve F1 freely oscillatable with the casing 1 and positioned in a water compartment B3 formed in the base of the main housing 3 at one end i.e. the pump end of the dynamometer. Further water compartments B1 and B2 are formed in the bottom of the main housing, the compartment B1 being separated from the compartment B2 by a weir plate W1 which is higher than a weir plate W2 separating the compartment B2 from the compartment B3 for the purpose hereinafter to be described. The pump delivers water raised from the compartment B3, through a control valve (Fig. 2) to compartments S4 and S5 positioned behind the stator half S2 and communicating with the ducts D for supplying water to the working compartment R1 having a discharge orifice O positioned in the lowest part of the casing and through which water is discharged from the dynamometer to the water compartment B2.

The shaft S passes through the stator halves S1 and S2 and also through the casing at each side of the pump chamber P3, with a slight clearance and the surface portions of the stator halves and of the casing surrounding the shaft are formed with a plurality of grooves spaced axially of the shaft and forming a throttled passage or labyrinth through which water is caused to flow in a manner hereinafter described. The said labyrinths are shown at L1, L2, L3 and L4 respectively.

In operation of the dynameter, the pump draws water from the water compartment B3, through the inlet valve F1, pipe F2 and duct F3 to the pump inlet P2 and water is discharged from the pump chamber P3 through the control valve to the compartments S4 and S5 and through ducts D into the working compartment of dynamometer where it is picked up in the vortex formed by the interaction of the rotor and the half stators. From the working compartment, the water passes through the discharge orifice O into the compartment B2. Due to the vortex action resulting from the interaction between the rotor and the half stators, the pressure of the water where it enters at the centre of the cups is increased both near the periphery of the rotor and also near the root of the rotor. In consequence, when the dynamometer is full or partially full, some of the water also escapes through the labyrinths L1 and L2 and after passing through L1 flows into a compartment Q6 which connects through ducts (not shown) with a discharge duct D3 from which the water is discharged to the compartment B1, and after passing through L2 the water enters a compartment Q5. The further passage of the water from this compartment will be hereinafter further described, but the pressure in compartment Q5 will be approximately atmospheric.

When a vane type pump as shown in Figure 1 is used, there is considerable whirl in the direction of rotation of the water in the pump inlet P2. This has the effect of producing a sharp pressure gradient between the surface of the shaft and the periphery of the feed annulus F4 with which the duct F3 communicates. To obviate this, straightener vanes V1 are fixed to the casing, and by this means the difference in pressure between the feed annulus F4 and the pump inlet P2 is comparatively small. Provided, therefore, that the ingress of air through labyrinth L3 and labyrinth L4 towards the pump inlet is avoided it is not difficult for the pump to lift water through the inlet valve F1, pipe F2 and duct F3 from the compartment B3.

To avoid the ingress of air through the labyrinths L3 and L4 a small bleed from the main water inlet supply is fed through a pipe Q1 and flows into a compartment Q2 which feeds the annulus F6 surrounding the further fixed straightener vanes V2 and as the pressure of the water in the zone of the vanes V1 is only slightly lower than atmospheric by reason of the action of the straightener vanes V1, only a small head of water is necessary in Q2 to keep the clearance space between the casing and the shaft which extends between the vanes V1 and the vanes V2 submerged, and so long as this condition is fulfilled, air will not be drawn into the pump inlet through the labyrinth L4.

By reason of the small head of water at Q2, there is also a small continuous leakage of water along labyrinth L4 and this water is drained into the compartment B3 through passages (not shown) leading from the annulus Q4 with which the labyrinth L4 communicates, to a discharge duct D4. Compartment Q2 is also in communication through passage D2 with compartment Q5 positioned between and in communication with the labyrinths L2 and L3, so that labyrinth L3 is also kept submerged.

When the working compartment of the dynamometer is running nearly full, the leakage along labyrinth L2 will be from left to right as viewed in Fig. 1 and labyrinth L3 will always be submerged in water and any surplus not taken through labyrinth L3 to the pump will pass from compartment Q5 to compartment Q2 by means of the passage D2, and thence as previously described through L4 to drain.

When the dynamometer working compartment is nearly empty the root of the rotor will be nearly dry and the flow of water will be from compartment Q2 to compartment Q5 whence it will pass along labyrinth L3 into the pump also and along labyrinth L2 into the working compartment of the dynamometer.

The passages feeding the compartment Q5 are so chosen that under all conditions an adequate wet seal is formed in the labyrinth L3 to prevent air being sucked into the pump.

The combination of pump size and area of the outlet passages from the dynamometer working compartment must be so chosen that under all operating conditions there is sufficient water passing through the machine to take away the heat generated by reason of the conversion of power into heat. It is normally accepted that this condition is fulfilled provided that 6½ gallons per hour of water is available for every H.P. absorbed. This quantity is necessary when recirculated water is used. However, under certain circumstances, water from an external source may be used which is available at much lower temperatures than re-circulated water but this water may have to be bought at high cost. For this reason, it is desirable to be able to regulate the quantity of cooling water provided from external sources and subsequently drained away from the machine to suit the particular conditions obtaining. One method of doing this is to feed all the cooling water into compartment B3, the major part of the water leaving the dynamometer being discharged through the orifice O into compartment B2. B1 is the drain compartment.

If only a small quantity of external water is fed into compartment B3 compared with the quantity of water being taken up by the pump and discharged into compartment B2, some of the water discharged to B2 will pass to the right over the weir plate W2 and be re-circulated through the pump. The balance, which will be substantially equal to the amount of cooling water fed from outside sources to compartment B3, will pass to the left over the weir W1 to the drain compartment B1. This means that only sufficient mains water need be fed to compartment B3 to maintain the temperature of the water in the dynamometer casing at a reasonable figure, say 140° to 160° F. This temperature can conveniently be indicated by means of a suitable thermometric device.

It will be apparent that water fed to the dynamometer casing by the pump is discharged through the orifice O and, when the dynamometer working compartment is running nearly full, also through the labyrinths L1 to L4. In order therefore to fulfill the required relationship between the flow of water into and out of the dynamometer casing the area of the orifice O and the respective flow areas of the labyrinths must be made such that the combined outflow rate of water is proportional to the square root of the casing pressure and of such an area with relation to the pump flow with the control valve fully open, as to ensure that the pressure in the dynamometer working compartment will give maximum dynamometer absorption capacity.

As previously stated, the labyrinths L1 to L4 are each formed by a plurality of annular grooves in the casing portion surrounding the shaft. In one form of labyrinth which has been successfully employed in carrying the invention into effect the grooves are made of square cross section $\frac{1}{8}'' \times \frac{1}{8}''$ and are axially spaced at $\frac{3}{16}''$ pitch to provide lands of a width of $\frac{1}{16}''$ and having sharp corners. The radial clearance between the lands and the shaft is made such that in combination with the grooves there is provided a throttled flow passage surrounding the shaft and having the required pressure drop/flow characteristic previously referred to. The minimum radial clearance between the lands and the shaft should not be less than .010" in order to avoid the possibility of a transition to laminar flow.

When it is required that the dynamometer will absorb the same amount of power when driven in either direction, one half of the rotor and the corresponding stator half are provided with vanes of opposite hand to the other half of the rotor and its corresponding stator half. In this case, the pump takes the form of a paddle wheel pump having radially extending vanes and although such a pump will operate successfully in either direction of rotation with a single outlet disposed radially with respect to the paddle wheel, it is found that by employing two outlets disposed tangentially of the paddle wheel, one for each direction of rotation, the size of the paddle wheel can be considerably reduced thereby giving a reduction in the minimum capacity of the dynamometer due to the reduced power required to drive the pump. With the employment of twin tangential outlets from the pump, the control valve interposed between the pump and the casing is required to include means for selectively connecting the outlets to the casing inlet and one construction of such a control valve is shown in Figure 2.

As will be seen from Figure 2, the valve comprises an elongated cylindrical sleeve 10 rotatably supported in a bore 11 formed in an extension 12 of the pump housing and through which extend ducts 13 and 14 connected to the pump chamber and opening into the bore 11 and axially spaced with respect thereto. The ducts 13 and 14 are respectively disposed tangentially with respect to the paddle wheel 15 of the pump on either side of the axis thereof so that when the paddle wheel rotates in an anti-clockwise direction as viewed in Figure 2, water is pumped through the duct 13 and when the paddle wheel rotates in the opposite direction, the water is pumped through the duct 14. The sleeve 10 is provided with two inlets ports 16 and 17 and an outlet port 18 extending respectively through the wall thereof.

The inlet ports 16 and 17 are diametrically opposed and axially displaced so as to register respectively with the ducts 13 and 14 and the outlet port 18 registers with suitable outlet ducts (not shown) leading to the compartments S4 and S5 in the dynamometer casing. A valve member 19 is slidably disposed in the lower end of the sleeve 10 and is secured to the lower end of an adjustment spindle 20 extending upwardly through the sleeve 10 and having a screw threaded upper portion 20a engaging in a correspondingly screw threaded bore in the upper end of the sleeve and extending outwardly therefrom to receive an adjusting knob 21 secured to the spindle 20 for rotation therewith. The valve member 19 is thus movable axially of the sleeve by rotation of the knob 21 to uncover progressively the outlet port 18 thereby to regulate the flow of water from the valve to the dynamometer casing. An operating handle 22 is secured to the upper end of the sleeve for effecting rotation thereof and a spring loaded detent 23 engages in recesses, one of which is shown at 24, angularly spaced around a collar 25 of the sleeve 10 and positioned so as selectively to secure the sleeve in one of three angularly adjusted positions i.e. a first position as shown in the drawing and in which the port 16 registers with the duct 13, for directing the water from the pump to the outlet 18 when the pump is rotating in the aforementioned anti-clockwise direction, a second position or shut off position angularly displaced 90° from the first position and in which both the ducts 13 and 14 are closed by the wall of the sleeve, and a third position angularly displaced 180° from the first position and in which the port 17 registers with the duct 14 for directing the water from the pump to the outlet 18 when the pump is rotating in the opposite direction.

I claim:

1. A hydraulic dynamometer comprising a housing, a casing rotatably supported by said housing for rotation about a horizontal axis, a pair of half-stators fixedly mounted in said casing and spaced along the said axis of rotation, a working compartment enclosed by the said half-stators and the peripheral wall of the casing, a shaft journalled in said casing and coaxial with the said axis of rotation, a rotor mounted on said shaft for rotation in said working compartment, a compartment in the lower portion of the housing below the said casing for containing operating liquid for the dynamometer, a pump chamber formed in said casing surrounding the shaft and separated from said working compartment by one of said stators, an impeller mounted on the shaft for rotation in said pump chamber, inlet duct means connecting the pump chamber with the working compartment for supplying liquid thereto, duct means extending downwardly from the casing into the said lower compartment and communicating with the pump chamber, whereby rotation of the impeller draws liquid from the lower compartment and discharges it to the working compartment at a rate proportional to the speed of the rotor, an outlet orifice positioned in a lower portion of the casing wall for discharging liquid from the working compartment to the said lower compartment, and annular throttled passages surrounding the shaft between the shaft and each half-stator and providing further discharge means for discharging liquid from the working compartment, said outlet orifice and throttled passages being formed to permit a combined outflow therethrough proportional to the square root of the pressure developed in the working compartment.

2. A dynamometer as claimed in claim 1, in which the casing at each side of the pump chamber is spaced from the shaft to provide restricted annular passages to which liquid is fed in order to provide non-contact seals between the shaft and the pump chamber.

3. A dynamometer as claimed in claim 1, including a valve interposed in the said outlet duct means for controlling the supply of liquid to the working compartment.

4. A dynamometer comprising a casing, stator means fixedly mounted within said casing, a working compartment formed by said stator means and a wall of the casing, a shaft journalled in said casing, a rotor mounted on the shaft for rotation within the said working compartment for cooperation with the stator and fluid contained in the working compartment to absorb energy, a pump located in a pump chamber separate from said working compartment and driven by said shaft to supply said fluid to the working compartment at a rate proportional to the speed of the rotor, an inlet passage connecting said pump chamber to said working compartment and terminating in said working compartment radially intermediate said shaft and casing wall, an outlet in said casing wall for discharging fluid from the working compartment, and additional means for discharging fluid from the working compartment, said additional means comprising an annular throttled passage encircling said shaft and leading axially outward from said working compartment along said shaft, said outlet and said additional discharging means having a pressure flow characteristic which permits a combined flow therethrough proportional to the square root of the pressure developed in said working compartment.

5. A dynamometer as claimed in claim 4 wherein the said annular passage is formed by a plurality of annular grooves in said stator means surrounding the shaft, the said grooves being spaced axially of the shaft and separated one from another by lands having a radial clearance with respect to the shaft.

6. A dynamometer as claimed in claim 5 in which an unobstructed annular passageway having a minimum radial width of $\frac{1}{10}$ of an inch is formed by said clearances between said lands and shaft.

References Cited in the file of this patent

UNITED STATES PATENTS

| | | |
|---|---|---|
| 1,992,910 | La Mater | Feb. 26, 1935 |
| 2,341,122 | Schmidt | Feb. 8, 1944 |
| 2,750,009 | Pohl | June 12, 1956 |
| 2,790,518 | Wilson | Apr. 30, 1957 |